United States Patent [19]
Charles-Messance et al.

[11] 3,905,583
[45] Sept. 16, 1975

[54] METHOD AND DEVICE FOR THE FABRICATION OF IMPROVED PLASTIC AND CELLULOSE FILMS

[75] Inventors: Francois Charles-Messance; Ernest Collobert, both of Mantes La Jolie, France

[73] Assignee: La Cellophane, Paris, France

[22] Filed: Nov. 9, 1973

[21] Appl. No.: 414,252

[30] Foreign Application Priority Data
Nov. 15, 1972 France .............................. 72.40454

[52] U.S. Cl. .......................................... 259/8; 259/9
[51] Int. Cl.² ............................................ B01F 5/16
[58] Field of Search .................. 259/7, 8, 9, DIG. 46

[56] References Cited
UNITED STATES PATENTS
| | | | |
|---|---|---|---|
| 2,932,493 | 4/1960 | Jacobs | 259/DIG. 46 |
| 3,417,970 | 12/1968 | Schwindy | 259/7 |
| 3,689,033 | 9/1972 | Holmstrom | 259/DIG. 46 |

*Primary Examiner*—Harvey C. Hornsby
*Assistant Examiner*—Alan Cantor
*Attorney, Agent, or Firm*—Sherman & Shalloway

[57] ABSTRACT

A method is described for effectively preventing the formation of hollows and bosses in wound viscose and cellulosic films formed from the extrusion of threadlike viscose or cellulosic elements. Such method involves the use of a mobile body located within the extruder hopper feed conduit and sweeping continuously around the inside periphery of this conduit. The result of such sweeping motion is to randomize the irregularities inherent in these extruded films and thereby eliminate superposition of repeating film characteristics giving, on winding, an extruded film of uniform average thickness.

15 Claims, 3 Drawing Figures

METHOD AND DEVICE FOR THE FABRICATION OF IMPROVED PLASTIC AND CELLULOSE FILMS

Among those methods presently employed to produce plastic films can be included the extrusion of a thermoplastic mass through a flat spinneret die. In one aspect of this process, viscose threads are extruded through a flat spinneret called a spinning hopper, the threads obtained from the coagulation of viscose in an acid bath. The cellulose films produced by such techniques appear to be composed of an ensemble of a multitude of elementary threads which can be traced back through the film and terminate at the slit of the spinneret die. While it would ordinarily be expected that such threads would form a film of homogeneous characteristics, this phenomenon is not observed due to the lack of homogeneity in the extruding mass. This film-forming mass is always heterogeneous and any film inevitably comprises what appears to be streaks moving lengthwise across the surface (across machine direction) of the film arising as a result of variations in machine temperature, viscose absorptive power and viscosity in the mixing and extruding mass. This lack of homogeneity is reflected as variations in appearance and of thickness. On winding then, the heterogeneous characteristics of the wound film appear as bosses and hollows in the final product.

In an attempt to overcome this formation of bosses and hollows in the winding, continuous movement of the point of application of the film on the winding roll has been used. This solution, as well as other attempts to diminish the presence of these imperfections in the wound film, has been merely a palliative and does not eliminate the intrinsic heterogeneous quality of the film. It is this heterogeneity that causes the variation in thickness of the film and results in the poor quality of wound films.

It is obvious that these defects can be made to disappear by the homogenization of the viscose threads in mixers before extrusion. These mixers may operate either dynamically or statically but, in any event, are cumbersome and require expensive extension of the fabrication period as well as complicated improvements of fabrication equipment.

The object of the present invention is to establish an economic process making it possible to reduce and distribute the inequalities of thickness and defects within the films obtained by the extrusion of spinneret-obtained fibers.

A further object of the present invention is to provide a device for feeding spinnerets for extrusion of plastic or cellulose films and made up of a cylindrical conduit of circular cross section characterized in that a mobile body moves inside such conduit. The movement of such body is by rolling or sliding on the conduit wall and thereby, essentially, continually traveling over the entire periphery of the conduit.

Other objects, features and advantages of this invention will be apparent from the following description which will be made partly by referring to the accompanying drawings wherein.

Figure 1:
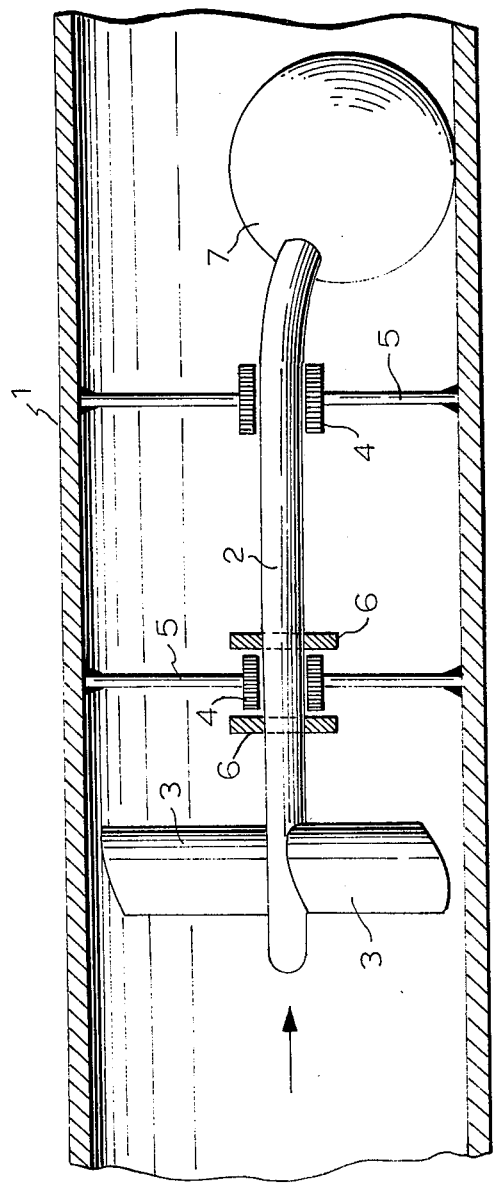
FIG. 1 is an axial view of a winged mobile body within the conduit.

In order to accomplish the objects of this invention, a process is used in which the threads to be fed into the extruder are mixed continually by moving the path of the threads at the entry of the hopper so that they never come out in the same place at the extrusion die. In this manner, then, the defects that are created as a result of the non-homogeneity of the threads are distributed randomly over the entire width of the film. This eliminates any defects arising as a result of the superposition of recurring film characteristics on winding and assures an extruded film having a uniform average thickness.

In order to achieve the object of this invention, a mobile body is moved inside the conduit bringing the material into the hopper. Any threads of material flowing parallel to the axis of the conduit and upstream from this moving part are thereby disturbed from such parallel alignment as they proceed downstream from this moving body. A further advantage can be obtained by placing such moving part as close as possible to the extrusion hopper so as to inhibit any local downstream effects which would eliminate or reduce the randomization effect sought by the constant movement of the threads into the extrusion apparatus and out of the spinneret die. In order to obtain this movement and particularly the movement of threads that flow close to the wall of the intake conduit, it is especially advantageous to have the mobile body within the conduit as close to the wall of such conduit as possible. The preferred geometry of the moving body is that of a ball-shape with a diameter somewhat greater than the radius of the circumference of the section of the conduit at the spot at which the ball is attached. In order to reduce any load losses, the moving body is preferably made of a rounded and streamlined shape so as to permit it to roll or slide more easily around the conduit wall as the threads move by.

According to the instant invention, the movement of the mobile body is preferably one of a continuous nature since it is necessary that the elementary threads are prevented from emerging from the extrusion die at any precise point but, rather, randomly vary across the width of such die. The continuous movement may have the form of a rocking movement but it is important that the entire section of the wall of the conduit be swept during this rocking action in order to effect the desired disturbance of the thread parallel alignment. In any event, these movements may be performed at either uniform or irregular speeds.

The rotational movement of the mobile body inside the conduit can be effected by any suitable mechanical means arranged on the outside of such conduit. Such mechanical means, however, are preferably those which avoid the use of shafts puncturing the conduit wall and mechanically driven from the outside. Shafts of this nature would have a tendency to leak and result in the escape of the material within the conduit.

According to this invention, it is preferable to use a fitting with inclined wings. The flow of the material through the conduit and past such fitting would cause a rotational movement of the fitting. Such device is represented schematically in FIG. 1.

In FIG. 1, the incoming plastic material flows in the direction of the arrow. In the center of conduit 1 is placed a bent shaft 2 carrying inclined wings 3. This shaft can turn on bearings 4 carried by stationary rods 5. Washers 6 forming stops hold this shaft in position. At the bent end of such shaft is fastened a ball 7 mounted on a swivel joint by means of a known spring system, not shown, so that it constantly rests on the walls of the conduit and is free to roll on it.

The incoming viscose material causes the wings to rotate which, by means of the bent shaft, causes the continuous rotation of ball 7 against the inside wall of the conduit.

Figure 2:
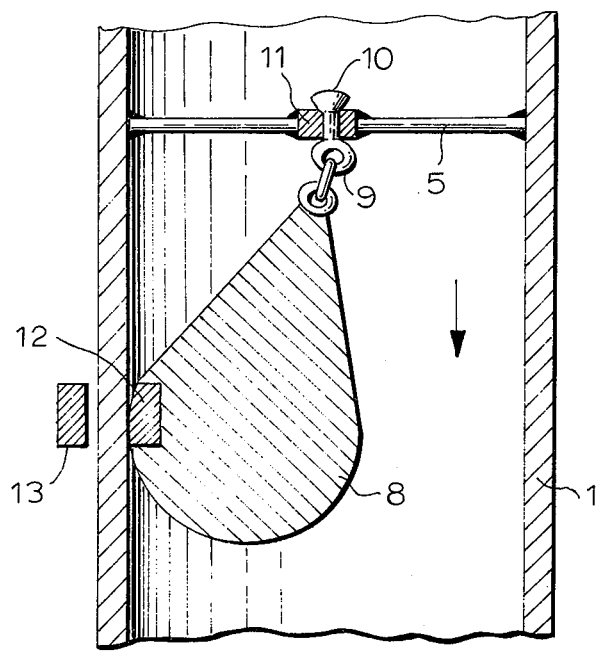
FIG. 2 is an axial view of a magnetically permeable mobile body within the conduit.
Figure 3:
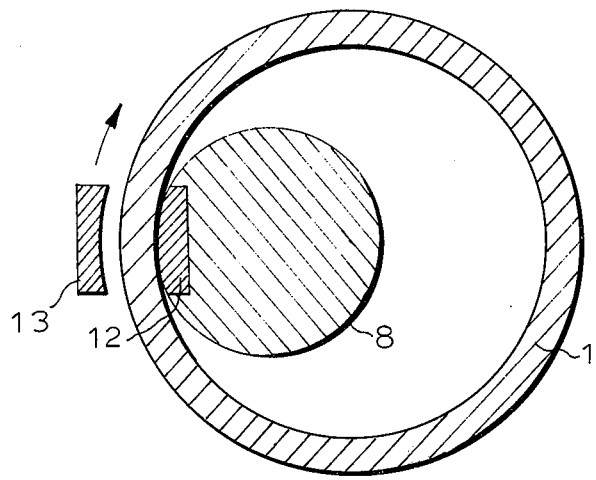
FIG. 3 is a cross sectional view of a magnetically permeable mobile body within the conduit.

FIGS. 2 and 3 disclose an additional embodiment of this mobile body but in which the rolling action is not caused as a result of the flow of the plastic mass.

In FIGS. 2 and 3, conduit 1 is a material permeable to a magnetic field. Mobile mass 8 is attached by means of rings 9 to shaft 10 which can rotate freely in a stationary bearing 11 attached securely to the walls of the conduit by means of rod 5. Within the mobile body 8 is placed a magnetized block 12. Opposite such block and outside of the conduit, a magnetic mass 13 having polarity opposite to that of magnetized block 12 is placed. This magnetic mass 13 is provided by known means, not shown, for continuous rotational movement about conduit 1 in a plane perpendicular to the latter. One such means, for example, may be by the effect of a turning electromagnetic field. By turning, magnetic mass 13 imparts a continuous and corresponding movement to mobile mass 8 by means of the magnetized mass 12. A similar effect can be achieved if the mobile mass 8 is a hollow body of soft iron and 13 is a sufficiently powerful turning magnet.

The continuous movement of these mobile bodies according to this invention produces a continuous mixing of the threads of the material that moves in conduit 1 in the direction indicated by the arrows.

The invention is not limited to the devices described. It extends to all devices making it possible to impart to a mobile body a continuous circular movement within the conduit for the feeding of hoppers for extrusion of plastic or cellulose films in a plane perpendicular to the axis of the conduit.

In all cases, the dimensions of the fittings and the power of the driving means should be adapted to the nature of the extruded products in mind as well as the extrusion conditions whose characteristics, such as viscosity, temperature, pressure, etc., vary with each product. For example, the shafts in rotation should turn in their housing with sufficient play so as to result in lubrication by the flowing material.

The following example is given by way of illustration only and is in no way to be construed as limiting.

EXAMPLE

A fitting identical with that shown in accompanying FIG. 1 is placed in a conduit 50 mm in diameter. The fitting is provided with a ball 30 mm in diameter and has a length of 160 mm. An input flow of viscose of 10 mm per second in the conduit gives a rotational speed of one turn for every 15 seconds of this device.

In order to ascertain the effectiveness of this mixing action, upstream from the device there is injected into the conduit a certain number of white-colored titanium dioxide pigmented viscose threads. It is observed that, at the outlet of the spinning hopper and in conjunction with the rolling of the mobile body, the colored threads describe long sinusoidal periods having an amplitude of 50 mm for a hopper of 0.50 m. Such periodic variation would be anticipated to reappear in the extruding film.

The same test was repeated but the mobile body was not placed in the conduit. In the absence of this device, the white-colored viscose threads formed continuous straight lengthwise stripes on the extruded film which were seen to superimpose at the time of rolling.

What is claimed is:

1. A method to randomize the across machine direction inequalities in thickness of cellulosic films obtained from the extrusion of viscose threads through an extrusion hopper wherein the viscose threads are fed to the extrusion hopper through a supply conduit, said viscose threads being obtained from the coagulation of viscose threads in an acid bath comprising the continuous randomization of said viscose threads within the supply conduit to the extrusion hopper wherein the randomization occurs as a result of the movement of a mobile body in contact with the inside wall and about the axis of the supply conduit.

2. A method according to claim 1 whereby the mobile body continuously moves in contact with the inside wall of said supply conduit as a result of the flow of the viscose threads past inclined wings fixably mounted on said mobile body.

3. A method according to claim 1 whereby the mobile body continuously moves in contact with the inside wall of said supply conduit as a result of the presence of an external magnetic field.

4. A method according to claim 3 whereby the external magnetic field rotates about the outside of said supply conduit.

5. The method of claim 1 wherein said mobile body is ball shaped and has a diameter which is greater than the radius of the supply conduit at the point at which the body is in contact therewith.

6. The method of claim 5 wherein the diameter of said ball shaped body is about 60 percent of the diameter of the supply conduit at the point at which the body is in contact therewith.

7. The method of claim 1 wherein said mobile body is ball-shaped and has an imperforate outer surface.

8. An appartus to randomize the across machine direction inequalities in thickness of cellulosic films obtained from the extrusion of viscose threads, wherein said threads are obtained from the coagulation of viscose threads in an acid bath including an extrusion machine, a supply hopper for feeding said extrusion machine, a supply conduit for said supply hopper and means for randomizing the flow of said viscose threads through said supply conduit said means including a mobile body within said supply conduit adapted to move in contact with the walls of and about the axis of said supply conduit.

9. An apparatus according to claim 8 wherein said mobile body includes fixably mounted inclined wings.

10. An apparatus according to claim 9 wherein said means for randomization includes a mobile body responsive to a magnetic field.

11. An apparatus according to claim 10 wherein said magnetic field is rotatable.

12. An apparatus according to claim 11 wherein said magnetic field includes an electromagnet.

13. The apparatus of claim 8 wherein said mobile body is ball-shaped and has a diameter which is greater than the radius of the supply conduit at the point at which the body is in contact therewith.

14. The appartus of claim 13 wherein the diameter of said ball-shaped body is about 60 percent of the diameter of the supply conduit at the point at which the body is in contact therewith.

15. The apparatus of claim 8 wherein said body is ball-shaped and has an imperforate outer surface.

* * * * *